United States Patent

Macaulay et al.

(10) Patent No.: US 7,519,047 B1
(45) Date of Patent: Apr. 14, 2009

(54) METHOD AND APPARATUS FOR CLONING TERMINALS IN A COMMUNICATIONS NETWORK

(75) Inventors: Robert A. Macaulay, Gloucester (CA); Milos Vodsedalek, Ottawa (CA); Brian B. Egan, Stittsville (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1925 days.

(21) Appl. No.: 09/723,591

(22) Filed: Nov. 28, 2000

(51) Int. Cl.
    *H04L 12/66* (2006.01)
(52) U.S. Cl. .................................. 370/352; 370/401
(58) Field of Classification Search ......... 370/352–356, 370/401; 379/211, 221, 221.02, 221.13, 379/212.01, 213.01, 214.01; 455/461, 432
    See application file for complete search history.

(56) References Cited

U.S. PATENT DOCUMENTS

| | | | | |
|---|---|---|---|---|
| 5,577,110 | A * | 11/1996 | Aquino ................... | 379/201.03 |
| 5,764,639 | A * | 6/1998 | Staples et al. ................ | 370/401 |
| 6,028,917 | A * | 2/2000 | Creamer et al. ......... | 379/100.01 |
| 6,144,671 | A * | 11/2000 | Perinpanathan et al. ..... | 370/409 |
| 6,178,238 | B1 * | 1/2001 | Bozek et al. ............ | 379/207.02 |
| 6,263,064 | B1 * | 7/2001 | O'Neal et al. .......... | 379/201.03 |
| 6,359,892 | B1 * | 3/2002 | Szlam ......................... | 370/401 |
| 6,381,320 | B1 * | 4/2002 | Creamer et al. ......... | 379/201.01 |
| 6,404,874 | B1 * | 6/2002 | Chestnut ................ | 379/211.02 |
| 6,449,483 | B1 * | 9/2002 | Akhteruzzaman et al. ... | 455/445 |
| 6,466,662 | B1 * | 10/2002 | Klaghofer et al. ...... | 379/212.01 |
| 6,516,061 | B2 * | 2/2003 | Horowitz et al. ............ | 379/233 |
| 6,542,475 | B1 * | 4/2003 | Bala et al. .................... | 370/271 |
| 6,636,587 | B1 * | 10/2003 | Nagai et al. .............. | 379/88.14 |
| 6,775,369 | B1 * | 8/2004 | McClung ................ | 379/211.04 |
| 6,798,767 | B1 * | 9/2004 | Alexander et al. .......... | 370/352 |
| 6,961,346 | B1 * | 11/2005 | Michalewicz et al. ....... | 370/465 |

* cited by examiner

*Primary Examiner*—Wing F Chan
*Assistant Examiner*—Robert C Scheibel
(74) *Attorney, Agent, or Firm*—Trop, Pruner & Hu, P.C.

(57) ABSTRACT

A communications system includes a local community having a local network coupled to various terminals. A server coupled to the local network includes a terminal proxy server and a switch module, such as a soft switch or a private branch exchange (PBX) application. A terminal, such as a remote terminal, can clone any of the terminals in the local community. The remote terminal sends a clone request to the terminal proxy server, which then associates the remote terminal as a clone of a local terminal. The cloning may override the local terminal, in which case the local terminal becomes inactive. Alternatively, the cloning may cause the remote terminal to be a replicate of the local terminal, in which case both terminals remain active. In another feature, multiple soft clients, replicating different local terminals, may co-exist on a single computer platform.

12 Claims, 8 Drawing Sheets

| CLONE TABLE 44 | | |
|---|---|---|
| DN | IP ADDRESSES | |
| 221 | A | |
| ... | | |
| 321 | B | |

FIG. 3A

| CLONE TABLE 44 | | |
|---|---|---|
| DN | IP ADDRESSES | |
| 221 | A | B |
| ... | | |
| 321 | | |

FIG. 3B

| CLONE TABLE 44 | | |
|---|---|---|
| DN | IP ADDRESSES | |
| 221 | B | |
| ... | | |
| 321 | | |

| IP ADDR | LOGICAL PORT | STATUS |
|---|---|---|
| A | LOGICAL PORT A | OVERRIDDEN |
| ... | | |
| B | LOGICAL PORT A | ACTIVE |

| IP ADDR | LOGICAL PORT | STATUS |
|---|---|---|
| A | LOGICAL PORT A | ACTIVE |
| ... | | |
| B | LOGICAL PORT A | ACTIVE |

| IP ADDR | LOGICAL PORT | STATUS |
|---|---|---|
| A | LOGICAL PORT A | ACTIVE |
| ... | | |
| B | LOGICAL PORT A | ON CALL |

METHOD AND APPARATUS FOR CLONING TERMINALS IN A COMMUNICATIONS NETWORK

TECHNICAL FIELD

This invention relates to cloning terminals in a communications network.

BACKGROUND

Many types of communications are possible over data networks, including electronic mail, web browsing, file downloads, electronic commerce transactions, text chat, and so forth. Networks include private networks, such as local area networks (LANs) or wide area networks (WANs), and public networks, such as the Internet.

With the increased capacity and reliability of packet-based data networks, voice communications (including telephone calls, video conferencing, and so forth) over data networks have become possible. Voice communications over packet-based data networks are unlike voice communications in a conventional public-switched telephone network (PSTN), which provides users with dedicated, end-to-end circuit connections (e.g., one or more time slots of a given channel) for the duration of each call. In a circuit-switched network, speech and control data are routed over the dedicated circuit connection during the call session. In contrast, communications over packet-based data networks, such as IP (Internet Protocol) networks, are performed using packets or datagrams that are sent in bursts from a source to one or more destination nodes. In a packet-based network, a dedicated channel portion is not provided; instead, the communications network is shared, with routing of packets performed based on addresses carried in the packets.

The types of equipment that may be used to perform telephony communications over packet-based data networks include computers that have voice processing components, including a speaker and a microphone. Such computers also include audio coder/decoders (CODECs), implemented in hardware and/or software, that convert between audio and digital data. The telephony application running in such a computer is often referred to as a soft client application, and the computer itself may be referred to as a "soft phone." One example soft client application is the i2050 product from Nortel Networks Limited.

Another type of device that is capable of telephony communications over a packet-based data network is a network telephone, such as the i2004 telephone set from Nortel. A network telephone may include a network interface and various layers (including network and transport layers) to enable communication of voice data over the data network.

In conventional circuit-switched telephony networks, telephones are coupled to a switch, such as a private exchange system (e.g., a PBX or private branch exchange system, a key telephone system, and so forth). A signaling channel between the switch and the telephone carries control signaling such as an alert message (to indicate an incoming call), commands to update the telephone display, an off-hook indication, an on-hook indication, an on-hold indication, signals carrying button or key presses of the telephone, and so forth. Once a call is established, a voice channel carries voice traffic between the switch and the telephone. The signaling and voice channels are physically associated with the switch port number that the telephone is plugged into. In the switch, a directory number (DN) of the telephone is also associated with the switch port.

With the advent of packet-based network telephony (e.g., IP telephony), telephone sets (e.g., network telephones or soft phones) are no longer connected directly to a switch. Instead, the telephone sets are coupled over a LAN, WAN, or Internet to a system running a Terminal Proxy Server (TPS). In most cases, the TPS resides in the same system as the switch (e.g., a PBX). The TPS acts as a proxy server on behalf of the various telephony clients (which are the telephone sets). The TPS reserves a logical port in the switch for the telephony client, and routes call control signaling messages and other traffic between the telephony client and the switch through this logical port.

A switch such as a PBX or key telephone system offers various services to users, including voice mail, telephony features such as call forwarding and speed dial, computer based applications such as database lookup, and so forth. These services are accessible from the telephone set that is connected to the switch, such as in an office network. However, when a user is not at the office (e.g., at home or traveling), many of these services are generally not available to the user.

SUMMARY

In general, in accordance with one embodiment, a method of controlling communications in a network comprises receiving a request to establish a first terminal as a clone of a second terminal. An indication is received from the first terminal, with the indication corresponding to activation of an element on the first terminal. The indication is processed based on information associated with the second terminal.

In general, in accordance with another embodiment, a method of controlling communications in a network comprises receiving a request to route signaling and traffic associated with a first terminal to a second terminal. A logical identifier of the first terminal is associated with the second terminal. A call request specifying the logical identifier of the first terminal is received, and an alert indication is sent to the second terminal.

Some embodiments of the invention may have one or more of the following advantages. Features and services that are typically available to a user in a local environment, such as in an office with a private branch exchange system or key telephone system, are also made available to a user at a location that is remote from the local environment. User convenience is enhanced since familiar services are available to the user even though he or she is at a remote location.

Other or alternative features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
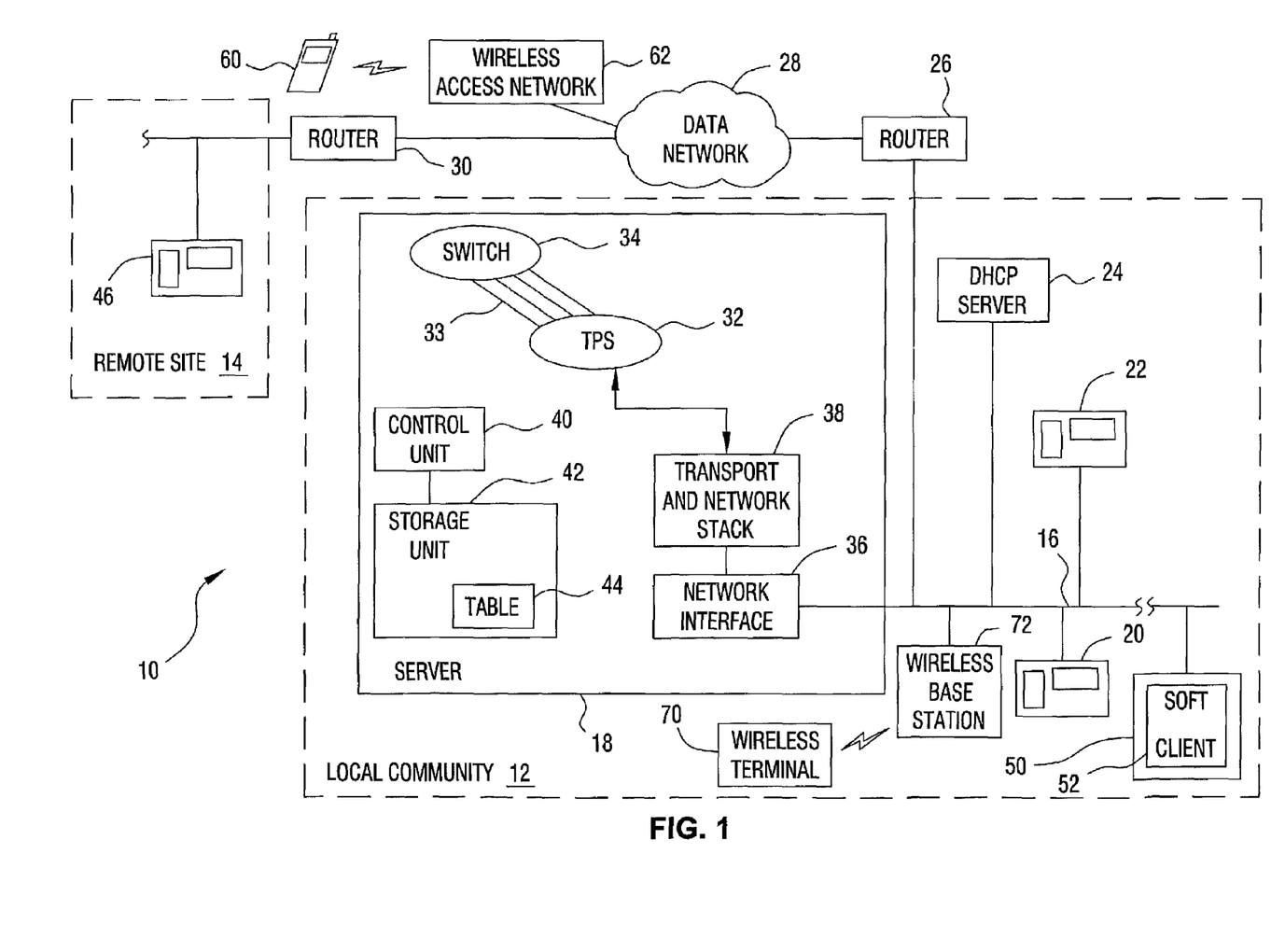
FIG. 1 is a block diagram of an embodiment of a communications system including plural terminals and a telephony server.

Referring to FIG. 1, a communications system 10 includes a local community 12 that includes a number of network elements coupled to a local network 16. The local network 16 can be a local area network (LAN) or a wide area network (WAN). The network elements coupled to the local network 16 include network telephones (IP sets) 20 and 22 and a computer 50 on which a telephony application 52 is executable. The telephony application uses the computer headset/speakers/soundcard to allow the application used to exchange voice packets while on a call. The telephony application is referred to as a "soft phone" or "soft client." A wireless terminal 70 is also coupled to the local network 16 through a wireless base station 72. The network telephones 20 and 22, the soft phone 52, and the wireless terminal 70 are capable of participating in voice and other real-time, interactive communications sessions over the local network 16. As used herein, each of the network telephones 20 and 22, the soft phone 52, and the wireless terminal 70, is referred to as a "terminal."

The terminals are capable of communicating with a telephony server 18 that is also coupled to the local network 16. The telephony server 18 includes a Terminal Proxy Server (TPS) 32 that is capable of communicating with a switch module 34 over a number of logical ports 33. The switch module 34 can be a soft switch or a private exchange application, such as a private branch exchange (PBX) or key telephone system application. The switch module 34 is responsible for the switching of calls involving terminals coupled to the local network 16 as well as other traditional terminals directly connected to the switch. In addition, the switch module 34 provides a number of services to various users. For example, such services include voice mail, telephony features such as call forwarding and speed dial, computer based applications such as database lookup, and so forth.

The server 18 includes a network interface 36 that is operatively coupled to the local network 16. One example embodiment of the network interface 36 is an Ethernet adapter for communicating over an Ethernet network 16. Above the network interface 36 is a transport and network stack 38. The transport and network stack 38 includes a network layer, such as an Internet Protocol (IP) layer, and a transport layer, such as a User Datagram Protocol (UDP) layer. One version of IP is described in Request for Comments (RFC) 791, entitled "Internet Protocol," dated September 1981; and another version of IP is described in RFC 2460, entitled "Internet Protocol, Version 6 (IPv6) Specification," dated December 1998. UDP is described in RFC 768, entitled "User Datagram Protocol," dated August 1980. Packets communicated over the network 16 are passed through the network interface 36 and the transport and network stack 38 to higher layers in the telephony server 18, such as the TPS 32 and the switch module 34.

In one arrangement, the TPS 32 and the switch module 34 are software routines that are executable on a control unit 40 in the server 18. The control unit 40 is coupled to a storage unit 42 for storing instructions and data.

Network elements in the local community 12 are capable of communicating with external devices, including devices coupled to a data network 28. In one example embodiment, the data network 28 is a public network such as the Internet. In another example, the data network 28 is a wide area network (WAN). The network protocol implemented on the data network 28 can also be IP. Network elements of the local community 12 communicate through a router 26 to the data network 28, which itself includes one or more routers. At a remote end, a router 30 enables communication between the data network 28 and a remote site 14, which can be a home office or a remote branch office, as examples. The remote site 14 includes one or more terminals 46 that are coupled to the routers 30. In the example of FIG. 1, the terminal 46 is a network telephone. Alternatively, the terminal 46 can also be a soft phone.

Wireless devices, such as a wireless telephone or personal digital assistant (PDA) device 60, are also capable of communicating with the data network 28 through a wireless access network 62. Examples of the wireless access network include code-division multiple access (CDMA) network, such as an IS-2000 CDMA network, or a time-division multiple access (TDMA) network, such as a General Packet Radio Service (GPRS) network, that enables packet-switched communications between wireless devices and the data network 28.

As terminals in the local community 12 are started, they are assigned directory numbers (DNs) by the switch module 34. In addition, the TPS 32 associates one of the logical ports 33 with a corresponding terminal. Call control and traffic signaling associated with a given terminal is communicated over the assigned logical port 33 between the terminal and the switch module 34 by the TPS 32.

In one embodiment, various types of signaling can be communicated between the switch module 34 and the terminals in the local community 12. Signals from the switch module 34 to a terminal include the following: an alert indication of an incoming call, commands to update displays, commands to change line icon states (e.g., on-hook, off-hook, on-hold, etc.), commands to turn on or off LED (light emitting diode) indications, and other commands. Signals from a terminal to the switch module 34 include the following: indications of button (e.g., speed-dial button and/or function button) or key (e.g., numeric key) presses, handset on-hook or off-hook indications, and others. After control signaling as listed above has been exchanged between a terminal and a switch module 34 to establish a call between two terminals, a voice channel between the terminals is used to exchange voice packets.

In this discussion, reference is made to voice communications. However, in other embodiments, other forms of real-time, interactive communications, such as interactive video communications, multimedia communications, and so forth, can also be performed.

A user that is using one of the terminals in the local community 12 generally has access to the various services provided by the switch module 34. However, in many conventional systems, such services are generally not available to remote users, such as a user of the terminal 46 in the remote site 14 or the user of the wireless terminal 60. In accordance with some embodiments of the invention, a user of the terminal 46 or wireless terminal 60 is provided access to the services provided by the switch module 34. In addition, terminal 46 may invoke a feature from the TPS 32 that causes terminal 46 or wireless terminal 60 to become a clone of one of the terminals in the local community 12. In the ensuing description, reference is made to making the terminal 46 a clone of a terminal in the local community 12; however, the same or similar techniques can be employed to make the wireless terminal 60 a clone of a local terminal.

By making the terminal 46 a clone, the user of terminal 46 sees all of the same functions of the corresponding terminal in the local community 12. For example, speed dial buttons on the terminal 46 have the same numbers associated with them as the corresponding terminal in the local community 12. Calls offered by the switch to the cloned terminal are also offered to terminal 46. Thus, by making the terminal 46 a clone of a local terminal, the terminal 46 effectively replicates the local terminal, even though the user may be located far away from the local community 12. As used here, a "clone" refers to a terminal that either takes the place of or is a replicate of another terminal.

To request that the terminal 46 be made a clone of a terminal within the local community 12, a user can enter commands in the user interface of the terminal 46 (e.g., activation of a sequence of keys or buttons of a network telephone or activation of elements in a graphical user interface of a soft phone). The request sent by the terminal 46 is referred to as a "clone request" that can be communicated over the data network 28 to the telephony server 18. The clone request is received by the TPS 32, which after some processing, sets the terminal 46 as a clone of a local terminal (referred to as the "cloned terminal") within the local community 12. When that occurs, the TPS 32 associates the remote terminal 46 with the logical port of the cloned terminal within the local community 12.

Figure 2:
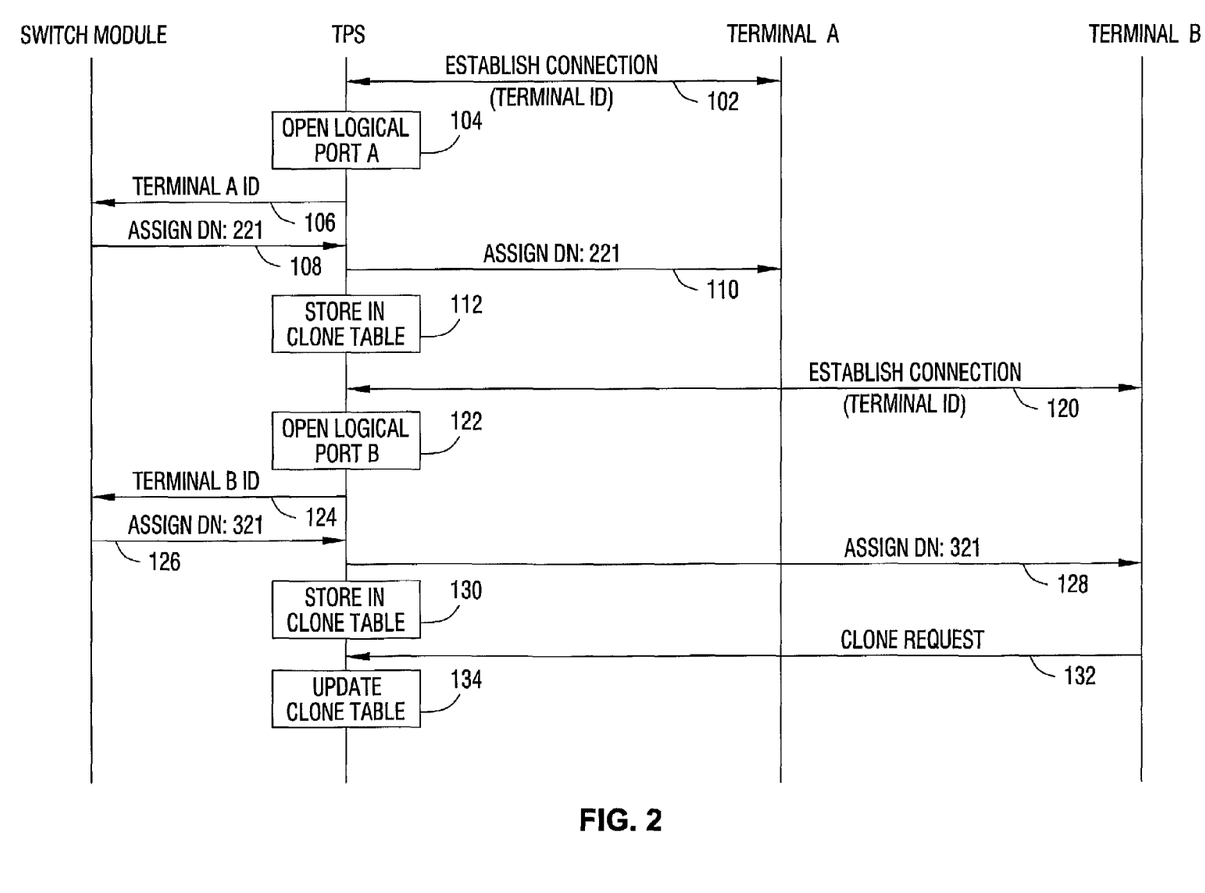
FIG. 2 is a message flow diagram of messages exchanged between, and acts performed by, network elements in the communications system of FIG. 1, in accordance with an embodiment.

Referring to FIG. 2, when terminal A first starts up, it establishes (at 102) a connection with the TPS 32. Terminal A can access a DHCP (Dynamic Host Configuration Protocol) server 24 to find an IP address of the server 18. DHCP, which enables the dynamic assignment of IP addresses and other configuration, is described in RFC 1541, entitled "Dynamic Host Configuration Protocol," dated October 1993. Alternatively, terminal A can be configured to connect directly to the IP address of the server 18. The TPS 32 opens (at 104) a logical port for terminal A (referred to as "logical port A"). Next, the TPS 32 sends (at 106) a unique identifier of terminal A (referred to as "terminal A ID") to the switch module 34 using logical port A. The terminal identifier for network telephones, such as IP sets from Nortel Networks, is a unique alphanumeric identifier embedded into the set firmware at manufacturing time. The Terminal A ID is passed to the TPS 32 as a parameter in the connection request sent to the TPS 32 by the Terminal A. Based on the Terminal A ID, the switch module 34 determines a directory number (DN) associated with terminal A, and sends (at 108) a message to display the directory number on terminal A. In the example of FIG. 2, the directory number is DN:221. The message sent at 108 is communicated over logical port A. The TPS 32 forwards the message (at 110) over the local network 16 to display DN:221 on terminal A.

The TPS 32 stores the directory number of terminal A (DN:221) in a clone table 44 (FIG. 1) that is stored in the storage unit 42 of the server 18. The clone table contains an entry for every active logical port 33. Initially, each logical port entry in the clone table contains the DN and IP address of the terminal that is using the logical port.

After the directory number has been assigned to terminal A, calls to terminal A can be made using the assigned directory number. If a terminal makes a call to DN:221, the switch module 34 sends an alert (ring) command message out on the logical port for terminal A. The TPS looks up the clone table 44 to determine the IP address associated with the logical port, and forwards the message to the IP address of terminal A. When the user at terminal A answers the incoming call by going off hook, or pressing the incoming call key, the answering event is sent to the TPS 32 which forwards it to the switch on the logical port associated with terminal A. The switch module 34 then sends a request to the TPS 32 to establish a media path between terminal A and the calling terminal. The TPS 32 does this by sending a command to terminal A, instructing it to start exchanging voice packets with the calling party. The command sent to terminal A by the TPS contains the calling party IP address, UDP ports to use, CODEC choice, number of voice frames per voice packet, and other information.

At some later time, terminal B, which may be a remote terminal such as the terminal 46 at the remote site 14 (FIG. 1), may also start up. Terminal B establishes a connection (at 120) with the TPS 32 in the telephony server 12. Terminal B may be provisioned with the IP address of the server 18, or alternatively, terminal B may access a DHCP server, such as DHCP server 24 or another DHCP server, to determine the IP address of the server 18. The TPS 32 then opens (at 122) a logical port for terminal B (referred to as "logical port B") on switch module 34, and the switch module 34 determines the DN (e.g., DN:321) of terminal B from its terminal ID. The directory number is communicated to terminal B by messages sent at 126 and 128. As with terminal A above, the TPS stores (at 130) the directory number and IP address of terminal B in the clone table 44 entry for logical port B.

Figure 3A:
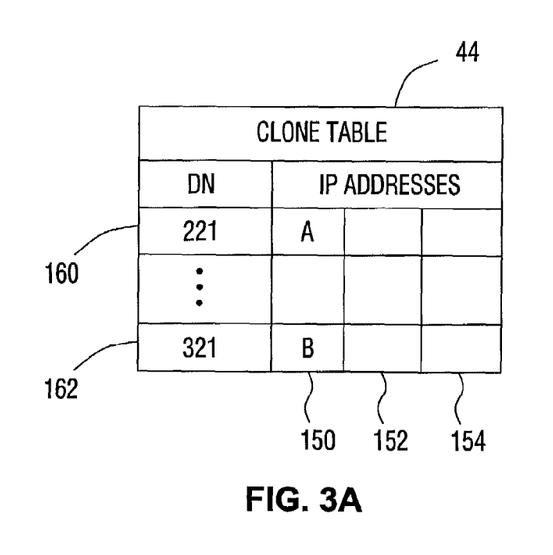
FIGS. 3A-3C illustrate a clone table for use in the telephony server of FIG. 1.

At this point, terminals A and B are separate devices that are independently coupled to the TPS. Terminals A and B are associated with different logical ports 33 between the TPS 32 and the switch module 34. As shown in FIG. 3A, the clone table 44 indicates that DN:221 is associated with the IP address of terminal A, as shown in row 160, and DN:321 is associated with the IP address of terminal B, as shown in row 162. The IP addresses of terminals A and B are stored in a column 150 to indicate that they are the primary terminals associated with the respective directory numbers DN:221 and DN:321. Columns 152 and 154 specify IP addresses of clones associated with each corresponding directory number. In the table 44 shown in FIG. 3A, the columns 152 and 154 are empty, indicating that cloning has not yet occurred.

Call requests targeted to terminal A are routed to terminal A, while call requests targeted to terminal B are routed to terminal B. Similarly, call services requested by either terminal is processed by the switch module 34 based on information associated with the corresponding terminal. For example, the switch module 34 can receive an off-hook event from a terminal followed by a number of digit keypress events, which indicates dialing an outgoing call. The switch module 34 can also receive keypress events of speed-dial buttons or other function buttons. The program information for such buttons may be stored in a terminal profile in the storage unit 42, with the terminal profile accessible by the switch module 34.

Figure 3B:
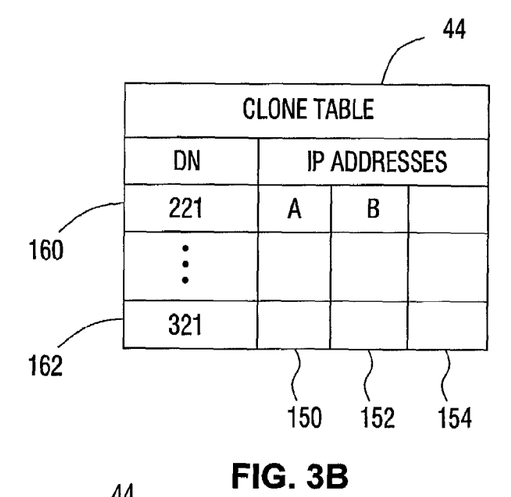

In accordance with some embodiments of the invention, terminal B can be made to be a clone of terminal A. This is accomplished by terminal B sending a clone request (at 132) to the TPS 32. The clone request 132 can specify the directory number of the terminal that the user wishes to clone. The clone request can be one message, or it can be a series of messages (such as a series of key or button presses). In response to the clone request, the TPS 32 updates (at 134) the clone table 44. Thus, as shown in FIG. 3B, IP address B is entered into the second column 152 of the row 160 corresponding to DN:221, and removed from the first column 150 of the row 162 corresponding to DN:321. By accessing the clone table 44, the TPS 32 can ascertain whether clones exist for a given directory number, and if so, to route call control signaling to the one or more clones. Having removed the IP address of terminal B from the logical port associated with terminal B, any messaging from the switch for terminal B will no longer be forwarded to terminal B, and terminal B will appear to have been disconnected from the switch.

Figure 3C:
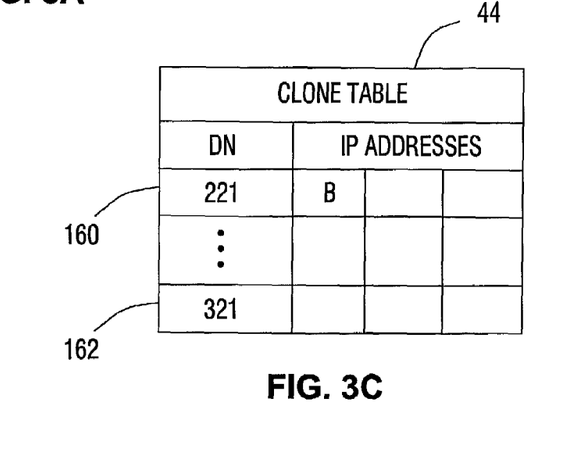

The cloning mechanism described above, where both terminals remain active is called "replicate cloning." In a second type of cloning, referred to as "override cloning," the cloned terminal (A) is removed from the cloning table 44, as shown in FIG. 3C, thereby disabling the cloned terminal (A) and replacing it with the terminal B clone.

Figure 4A:
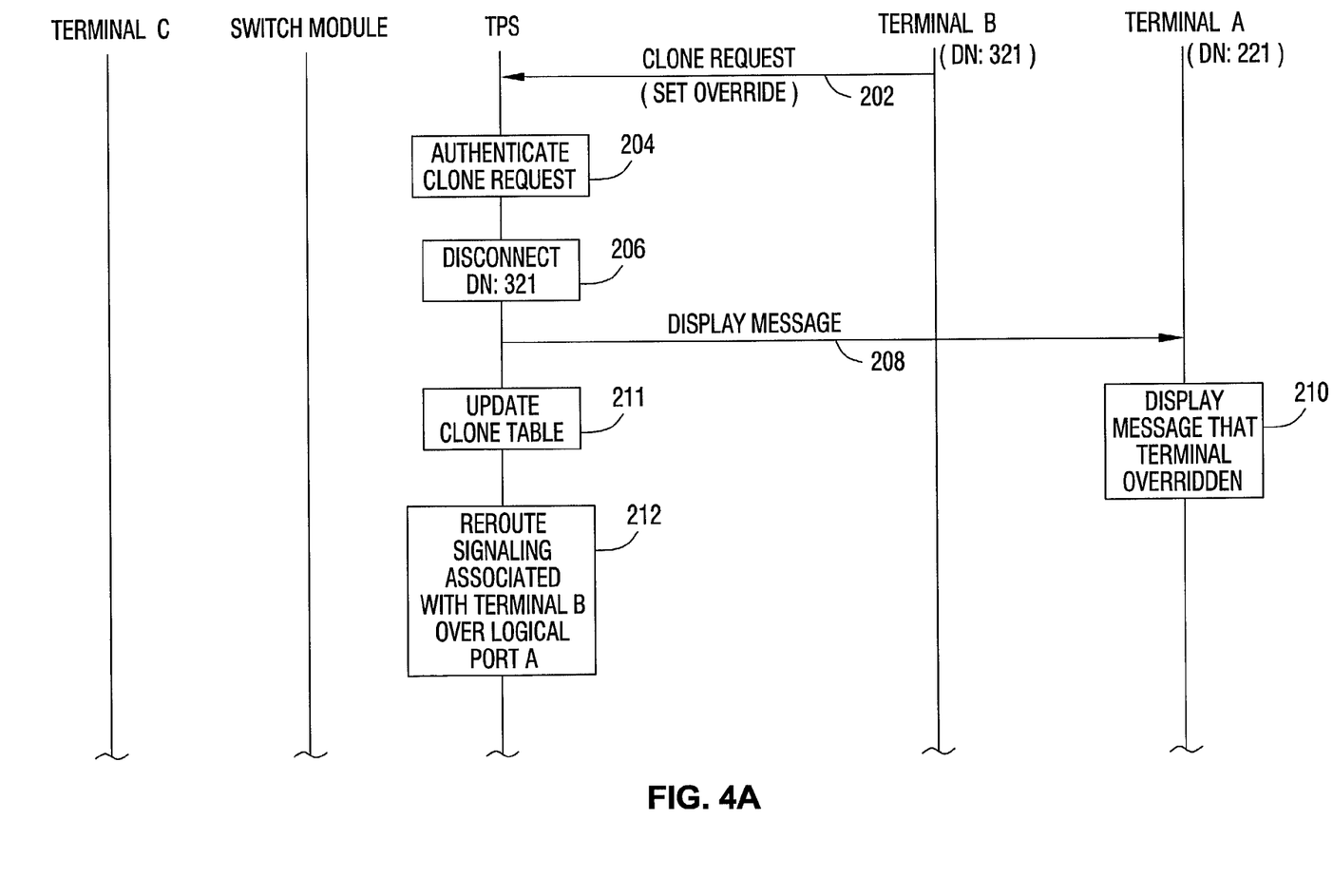
FIGS. 4A-4B are a message flow diagram of a process of overriding a first terminal and re-routing call control and traffic signaling of the first terminal to a second terminal.
Figure 4B:
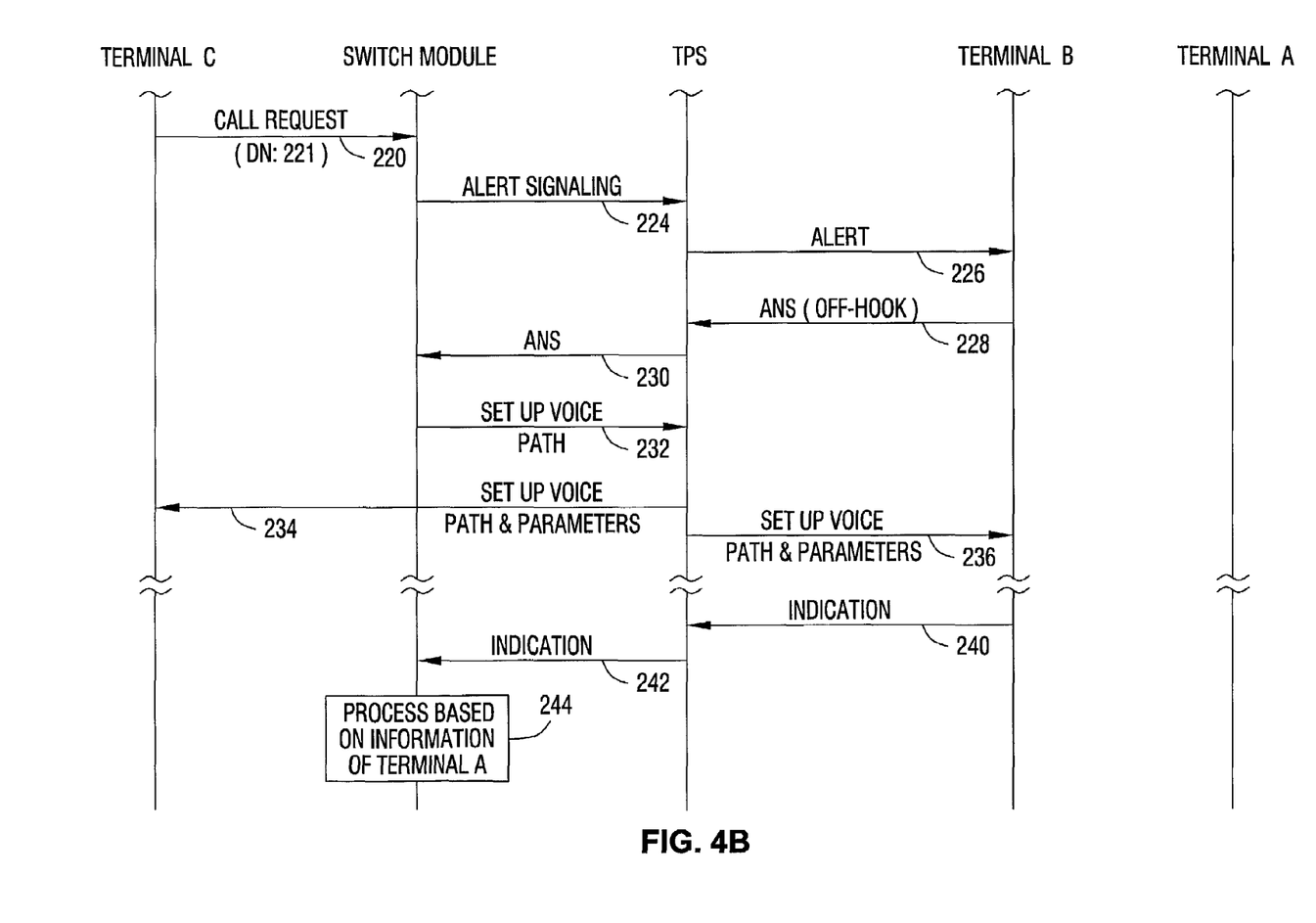

Referring to FIGS. 4A-4B, a message flow diagram illustrates a process involving override cloning. Terminal B, associated with DN:321, sends (at 202) a clone request with a set override indication to override the terminal being cloned (in this example terminal A associated with DN:221). The TPS 32 authenticates (at 204) the clone request from the terminal B. For example, terminal B may be required to issue a valid password before the TPS 32 will perform a cloning procedure. After authentication, the TPS 32 disconnects (at 206) DN:321 (which is associated with terminal B). Thus, calls to DN:321 are disallowed.

Figure 6A:
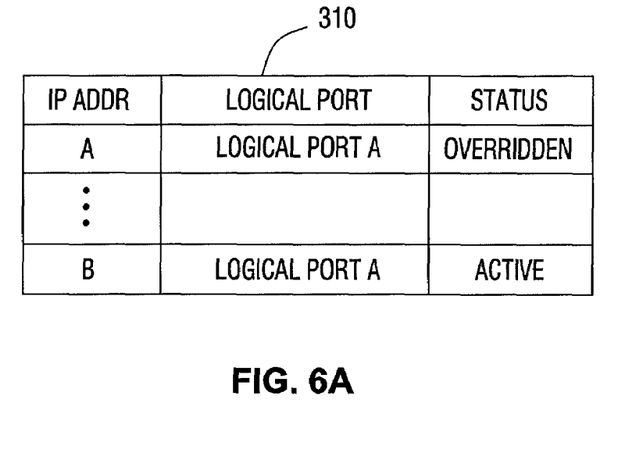
FIGS. 6A-6C illustrate a logical port table maintained by a terminal proxy server (TPS) in the telephony server of FIG. 1.

The TPS 32 then sends a display message (at 208) to terminal A. In response to the display message, terminal A presents (at 210) in its display a message that indicates that the terminal has been overridden. The TPS 32 also updates (at 211) the clone table 44 to indicate that signaling for logical port A (DN:221) is now associated with terminal B (FIG. 3C). The TPS 32 also re-routes (at 212) signaling associated with terminal B over logical port A, which is associated with overridden terminal A. This can be indicated in a logical port table 310 as shown in FIG. 6A, which associates an IP address of a terminal with a logical port and a status. Thus, at this point, the logical port table 310 shows that terminal A has been overridden, and terminal B is associated with logical port A. Instead of using the IP addresses of terminals A and B, an alternative arrangement of the table 310 associates terminal IDs of terminals A and B with the logical ports and status information.

After the cloning has been completed, a call request from a calling terminal (terminal C) is received (at 220). The call request contains DN:221, which was previously associated with terminal A but now is associated with terminal B. In response to the call request, the switch module 34 sends an alert (ring) command to logical port A (at 224). The TPS 32 forwards the alert message (at 226) to alert the terminal (DN:321) associated with logical port A. If terminal B answers, then an off-hook or some other answer is sent (at 228) to the TPS 32. The answer indication is sent (at 230) by the TPS 32 to the switch module 34. In response, the switch module 34 asks the TPS 32 to set up the voice path between the caller (at terminal C) and the terminal associated with logical port A (DN:221). In response to the setup command from the switch module 34, the TPS 32 sends messages to terminal C (at 234) and to terminal B (at 236) to establish a media path between terminals B and C. The message or messages sent by the TPS 32 to each of terminals B and C contain parameters such as the IP address of the peer terminal, Real-Time Protocol (RTP) and Real-Time Control Protocol (RTCP) ports, CODEC selection information, number of RTP frames in a packet, and so forth.

In the example given in FIGS. 4A-4B so far, an incoming call request specifying the logical identifier (e.g., directory number) of terminal A is processed by re-routing to terminal B. Terminal B can also initiate a call session. This can be performed by sending (at 240) some indication (e.g., off-hook, activation of speed-dial button, activation of function button, etc.) from terminal B to the TPS 32. The indication is communicated (at 242) to the switch module over logical port A (instead of logical port B) to the switch module 34. In response to the indication, the switch module 34 accesses profile information associated with logical port A (and terminal A) and processes (at 244) the incoming indication based on the profile information.

Figure 5:
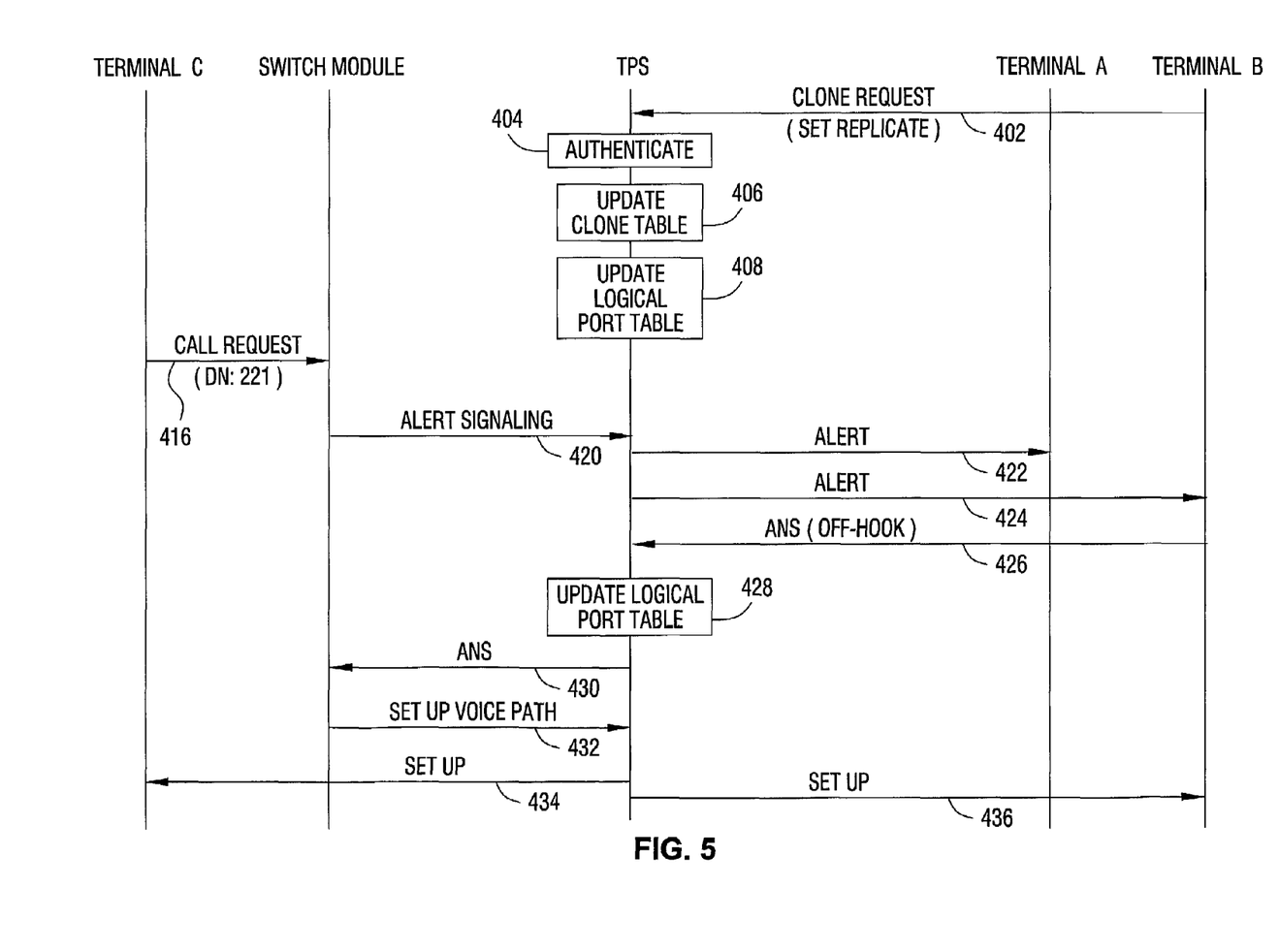
FIG. 5 is a message flow diagram of a process of replicating a first terminal with a second terminal and routing call control and traffic signaling associated with the first terminal to both the first and second terminals.
Figure 6B:
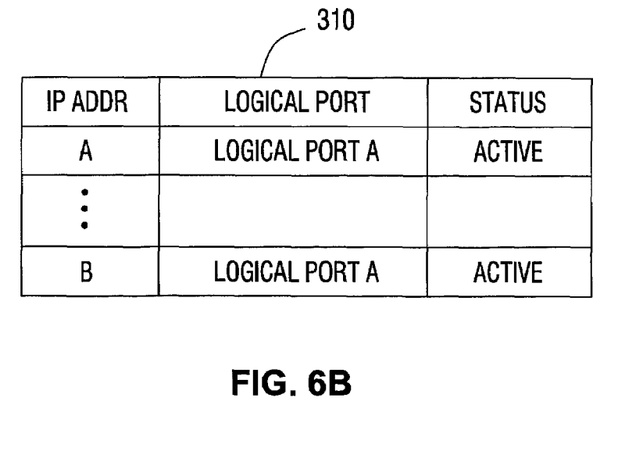

Referring to FIG. 5, in accordance with another embodiment, a clone request issued by terminal B includes an indication that terminal B is to be a replicate of terminal A (replicate cloning). Thus, the clone request does not override terminal A, as in the example of FIG. 4. The TPS 32 authenticates the clone request (at 404), and if the authentication passes, updates (at 406) the clone table 44 to indicate that the IP address of terminal B is also associated with DN:221 (FIG. 3B). Next, the TPS 32 updates (at 408) the logical port table 310, as shown in FIG. 6B. In this example, terminal A is not indicated as being overridden, as in the case of FIG. 6A. Rather, terminal A is still associated with logical port A. Further, terminal B is also associated with logical port A so that signaling associated with terminal B will be communicated between the TPS 32 and the switch module 34 over logical port A.

Figure 6C:
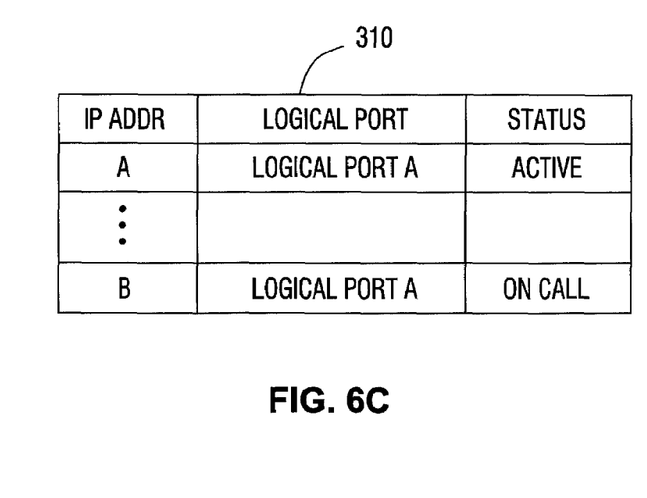

At this point, terminal B has successfully replicated itself as a clone of terminal A. Next, a call request is received (at 416) specifying DN:221. The switch module 34 then sends (at 420) alert signaling to the TPS 32, which then sends (at 422) an alert to terminal A. In addition, the TPS 32 sends (at 424) another alert message to terminal B. In the illustrated embodiment, separate alerts are sent by the TPS 32 to terminals A and B. Alternatively, the alert can be sent by multicast, such as IP multicast, for receipt by multiple terminals. A version of IP multicast is described in RFC 1301, entitled "Multicast Transport Protocol," dated February 1992. Thus, both terminals A and B are alerted of the incoming call. A user can answer the call at either terminal A or terminal B. In the example of FIG. 5, the user at terminal B answers first by sending an off-hook indication (at 426) to the TPS 32. The TPS 32 then updates the logical port table (at 428) to indicate that terminal B is taking the call (FIG. 6C).

For replicated terminals, only one of the terminals can be on a call at any given time. The TPS indicates which of the replicates is "on call" via the status field of the logical port mapping table 310. Any subsequent voice related command from the switch module 34 (such as setup voice exchange with far end) will only be directed to the replicate which is on call.

The answer indication from terminal B is sent (at 430) from the TPS 32 to the switch module 34. In response to the answer request, the switch module 34 sends a command to the TPS 32 to set up the voice path between terminal C and the terminal associated with DN:221. As a result, the TPS 32 sends a setup command to terminal C (at 434) as well as a setup command to terminal B (at 436). A media path is then set up between terminals B and C. The call setup command is sent to terminal B (at 436) and not to terminal A. This is because terminal B has the "on call" status in the logical port table (at 428).

In the above example, if terminal A was the first to answer the call, then the voice path is set up between terminals A (instead of B) and C.

Figure 7:
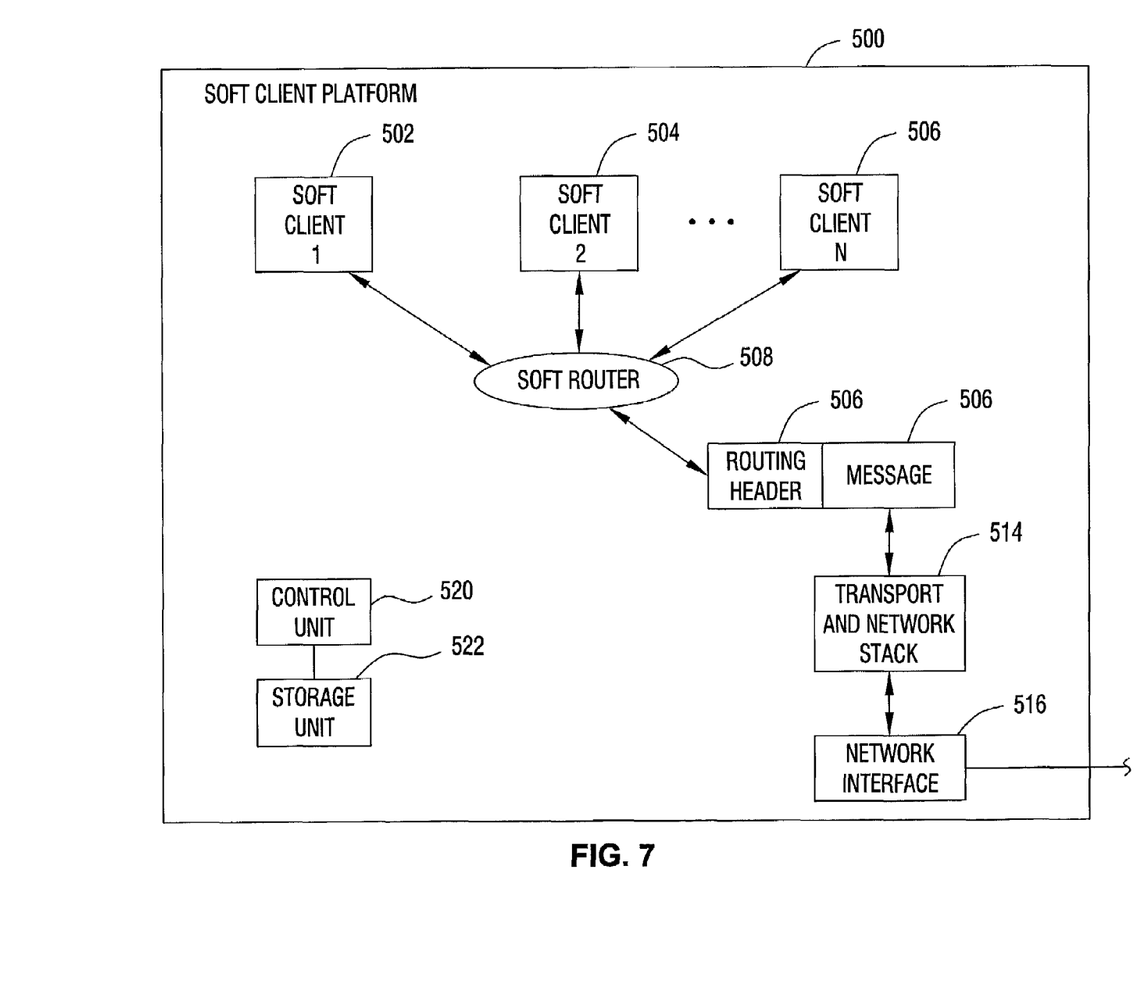
FIG. 7 is a block diagram of a soft phone having plural soft clients that are clones of respective terminals in the communications system of FIG. 1.

An extension to the ability to clone terminals coupled to the TPS 32 and switch module 34 is the ability to clone multiple terminals within one platform or system. This is shown in FIG. 7, which shows a personal computer running several instances of soft clients: modules 502, 504, and 506. The soft client module 502 can be a clone of terminal 1 in the local community 12, the soft client 504 can be a clone of terminal 2 in the local community 12, and the soft client 506 can be a clone of terminal N in the local community 12. The soft client modules are executable on a control unit 520 that is coupled to a storage unit 522.

The various procedures discussed above with respect to cloning are applicable to each of the soft client modules 502, 504, and 506. Thus, the soft client module 502 can send a clone request to the TPS 32 to clone terminal 1, the soft client 504 can send a clone request to the TPS 32 to clone terminal 2, and the soft client 506 can send a clone request to the TPS 32 to clone terminal N. In response to each of the cloning requests, cloning processing performed either in FIG. 4 (for override) or FIG. 5 (for replicate) can be performed.

One of the issues with loading multiple soft client modules in one system is that the soft client (computer) platform may be associated with only a single IP address. Thus, the soft client modules 502, 504, and 506 share the same IP address.

To differentiate the soft client modules 502, 504, and 506 for both inbound and outbound data, a soft router 508 is implemented on the soft client platform 500. The soft router 508 is responsible for routing incoming messages to the appropriate ones of the soft client modules 502, 504, and 506 as well as to add some marking or code to outbound messages regarding which of the soft clients 502, 504, and 506 originated the message. The marking or code includes a router header 510 added to outbound message 512. The router header 510 and outbound message 512 are encapsulated in an IP packet by a transport and network stack 514, and the packet is communicated to the network by a network interface 516. The TPS 32 can determine which of the soft client modules 502, 504, and 506 originated the message 512 based on the router header 510. In response to the content of the router header 510, the TPS 32 selects one of plural logical ports to communicate the content of the message 512. Thus, messages from a soft client module 502 are communicated over a first logical port, messages from the soft client 504 are communicated over a second logical port, and messages from the soft client 506 are communicated over a third logical port.

When sending messages to the soft client platform 500, the TPS 32 also adds the routing header 510 to the messages. Upon receiving the message 512 and routing header 510 from the TPS 32, the soft router 508 sends the message 512 onto the appropriate one of the soft clients based on the content of the routing header 510.

Instructions of the various software routines or modules discussed herein may be stored on one or more storage units in corresponding systems and devices and loaded for execution on corresponding control units. The control units include microprocessors, microcontrollers, processor cards (including one or more microprocessors or microcontrollers), or other control or computing devices. As used here, a "controller" refers to hardware, software, or a combination thereof. A "controller" can be made up of one component or plural components.

The storage units include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; and optical media such as compact disks (CDs) or digital video disks (DVDs). Instructions that make up the various software routines or modules in a node and stored in a respective storage unit when executed by a control unit cause the corresponding node to perform programmed acts.

The instructions of the software routines or modules are loaded or transported into the system or device in one of many different ways. For example, code segments including instructions stored on floppy disks, CD or DVD media, a hard disk, or transported through a network interface card, modem, or other interface device are loaded into the node and executed as corresponding software routines or modules. In the loading or transport process, data signals that are embodied in carrier waves (transmitted over telephone lines, network lines, wireless links, cables, and the like) communicate the code segments, including instructions, to the node. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. An article comprising at least one storage medium containing instructions that when executed cause a system to:
   receive a request to establish a first terminal as a clone of a second terminal;
   in response to the request, associate a first logical port between a telephony proxy server and a switch module with both the first and second terminals;
   receive, at the switch module, a call request specifying the second terminal as a target;
   forward, by the switch module, the call request through the first logical port to the telephony proxy server, and route, by the telephony proxy server, the call request to the first terminal;
   wherein the instructions when executed cause the system to further disable the second terminal.

2. A system comprising:
   an interface to a network coupled to at least a first terminal and a second terminal; and
   a control module adapted to, in response to a request from a first terminal, define the first terminal as a clone of a second terminal, the control module adapted to further:
   store a table associating identifiers of the first and second terminals with a first logical port,
   receive a call request containing a first logical identifier associated with the first and second terminals,
   in response to the call request, alert both the first and second terminals, and
   based upon whether the first terminal or second terminal answered the call request, update the table to indicate that the one of the first and second terminals that answered the call request is the terminal to which subsequent call requests containing the first logical identifier are to be directed.

3. The system of claim 2, wherein the first logical identifier comprises a directory number.

4. The system of claim 2, further comprising a switch module communicatively coupled to the control module.

5. The system of claim 4, wherein the control module is adapted to receive a request from the first terminal to establish a call, and wherein the switch module is adapted to treat the request as a request from the second terminal.

6. The system of claim 4, wherein the switch module is associated with plural logical ports, the control module adapted to select one of the logical ports for communicating signaling of the first terminal.

7. The system of claim 6, wherein the selected logical port comprises a logical port assigned to the second terminal.

8. The system of claim 2, wherein the control module comprises a terminal proxy server.

9. The system of claim 8, further comprising a storage unit containing information associating a directory number with the first and second terminals.

10. The system of claim 2, wherein the control module is adapted to set the first terminal as a replicate of the second terminal.

11. The system of claim 2, wherein the interface comprises an interface to an Internet Protocol network.

12. The system of claim 2, wherein the first terminal comprises a wireless terminal.

* * * * *